(12) United States Patent
Yang et al.

(10) Patent No.: US 11,094,460 B2
(45) Date of Patent: Aug. 17, 2021

(54) CAPACITOR COMPONENT

(71) Applicant: Samsung Electro-Mechanics Co., Ltd., Suwon-si (KR)

(72) Inventors: Jeong Suong Yang, Suwon-si (KR); Bon Seok Koo, Suwon-si (KR); Sung Min Cho, Suwon-si (KR); Woong Do Jung, Suwon-si (KR); Hai Joon Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 58 days.

(21) Appl. No.: 16/275,795

(22) Filed: Feb. 14, 2019

(65) Prior Publication Data
US 2020/0066444 A1 Feb. 27, 2020

(30) Foreign Application Priority Data
Aug. 22, 2018 (KR) .......................... 10-2018-0098188

(51) Int. Cl.
*H01G 4/012* (2006.01)
*H01G 4/30* (2006.01)
*H01G 4/228* (2006.01)
*H01G 4/12* (2006.01)

(52) U.S. Cl.
CPC ............... *H01G 4/012* (2013.01); *H01G 4/12* (2013.01); *H01G 4/228* (2013.01); *H01G 4/30* (2013.01)

(58) Field of Classification Search
CPC .......... H01G 4/30; H01G 4/232; H01G 4/252; H01G 4/012; H01G 4/228; H01G 4/12

USPC ......... 361/321.2, 301.4, 306.3, 321.1, 321.3, 361/306.1
See application file for complete search history.

(56) References Cited

U.S. PATENT DOCUMENTS

| | | | | |
|---|---|---|---|---|
| 5,866,196 A | * | 2/1999 | Ueno | ...................... C04B 35/47 427/79 |
| 9,653,211 B2 | | 5/2017 | Kisumi et al. | |
| 9,758,695 B2 | | 9/2017 | Hong et al. | |
| 2009/0296311 A1 | * | 12/2009 | Otsuka | ...................... H01G 4/30 361/306.3 |

(Continued)

FOREIGN PATENT DOCUMENTS

| KR | 10-2014-0053562 A | 5/2014 |
|---|---|---|
| KR | 10-1703195 B1 | 2/2017 |

*Primary Examiner* — Arun Ramaswamy
(74) *Attorney, Agent, or Firm* — Morgan, Lewis & Bockius LLP

(57) ABSTRACT

A capacitor component includes: a body including a dielectric layer and first and second internal electrodes alternately disposed with the dielectric layer interposed therebetween; first and second external electrodes including first and second connection portions, and first and second band portions extending onto portions of a surface from the first and second connection portions, respectively; first and second plating layers disposed on the first and second band portions, respectively; humidity resistant layers disposed between the first and second external electrodes, disposed on the first and second external electrodes, and having openings respectively exposing portions of the first and second band portions. The first and second plating layers are disposed in the openings of the humidity resistant layers, respectively, and are in contact with the first and second band portions, respectively.

20 Claims, 5 Drawing Sheets

(56) References Cited

U.S. PATENT DOCUMENTS

| | | | |
|---|---|---|---|
| 2010/0290172 A1* | 11/2010 | Motoki | H01G 4/2325 |
| | | | 361/305 |
| 2014/0085767 A1* | 3/2014 | Kang | H01G 4/30 |
| | | | 361/301.4 |
| 2014/0116766 A1 | 5/2014 | Jeon et al. | |
| 2015/0124370 A1* | 5/2015 | Ahn | H01G 4/232 |
| | | | 361/272 |

* cited by examiner

I – I'

CAPACITOR COMPONENT

CROSS-REFERENCE TO RELATED APPLICATIONS

This application claims the benefit of priority to Korean Patent Application No. 10-2018-0098188 filed on Aug. 22, 2018 in the Korean Intellectual Property Office, the disclosure of which is incorporated herein by reference in its entirety.

TECHNICAL FIELD

The present disclosure relates to a capacitor component.

BACKGROUND

A multilayer ceramic capacitor (MLCC), a type of capacitor component, is an important chip component used in industrial areas relating to communications, computing, home appliances, automobiles, and the like, due to advantages thereof such as compactness, guaranteed high capacitance, and desirable mountability. In particular, an MLCC is a core passive component used in various electric, electronic, and information communications devices such as mobile phones, computers, digital televisions (TVs), and the like.

Along with the recent trend for electronic devices to have a more compact size and higher performance, it is becoming more important to secure reliability, humidity resistance reliability in particular, of capacitor components.

Further, as the development of electric cars, self-driving cars, and the like, is underway in automobile industries, there has been demand for an increasing number of MLCCs. Furthermore, the MLCCs used in cars and the like, are required to endure far severe reliability conditions.

SUMMARY

An aspect of the present disclosure is to provide a capacitor component having excellent humidity resistance reliability.

According to an aspect of the present disclosure, a capacitor component includes: a body including a dielectric layer and first and second internal electrodes alternately disposed with the dielectric layer interposed therebetween, and having first and second surfaces opposing each other, third and fourth surfaces connected to the first and second surfaces and opposing each other, and fifth and sixth surfaces connected to the first to fourth surfaces and opposing each other; first and second external electrodes including first and second connection portions disposed on the third and fourth surfaces of the body, respectively, and first and second band portions extending onto portions of the first surface from the first and second connection portions, respectively; plating layers disposed on the first and second band portions; and humidity resistant layers disposed between the first and second external electrodes, disposed on the first and second external electrodes, and having openings exposing portions of the first and second band portions, respectively. The first and second plating layers are disposed in the openings of the humidity resistant layers, respectively, and are in contact with the first and second band portions, respectively. The humidity resistant layers are disposed on portions of the first and second external electrodes in which the plating layers are not disposed, and on portions of the body on which the first and second external electrodes are not disposed.

According to another aspect of the present disclosure, a capacitor component includes: a body including a dielectric layer and first and second internal electrodes alternately disposed with the dielectric layer interposed therebetween, and having first and second surfaces opposing each other, third and fourth surfaces connected to the first and second surfaces and opposing each other, and fifth and sixth surfaces connected to the first to fourth surfaces and opposing each other; first and second external electrodes including first and second connection portions disposed on the third and fourth surfaces of the body, respectively, and first and second band portions extending onto portions of the first surface from the first and second connection portions, respectively; first and second plating layers disposed on the first and second band portions, respectively, and extending onto portions of the first and second connection portions, respectively; and humidity resistant layers disposed between the first and second external electrodes, disposed on the first and second external electrodes, and having openings respectively exposing portions of the first and second band portions and portions of the first and second connection portions. The first plating layer is disposed in the openings of the humidity resistant layers exposing the first band portion and the portion of the first connection portion, and is in contact with the first band portion and the first connection portion, and the second plating layer is disposed in the openings of the humidity resistant layers exposing the second band portion and the portion of the second connection portion, and is in contact with the second band portion and the second connection portion. The humidity resistant layers are disposed on portions of the first and second external electrodes in which the plating layers are not disposed, and on portions of the body on which the first and second external electrodes are not disposed.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
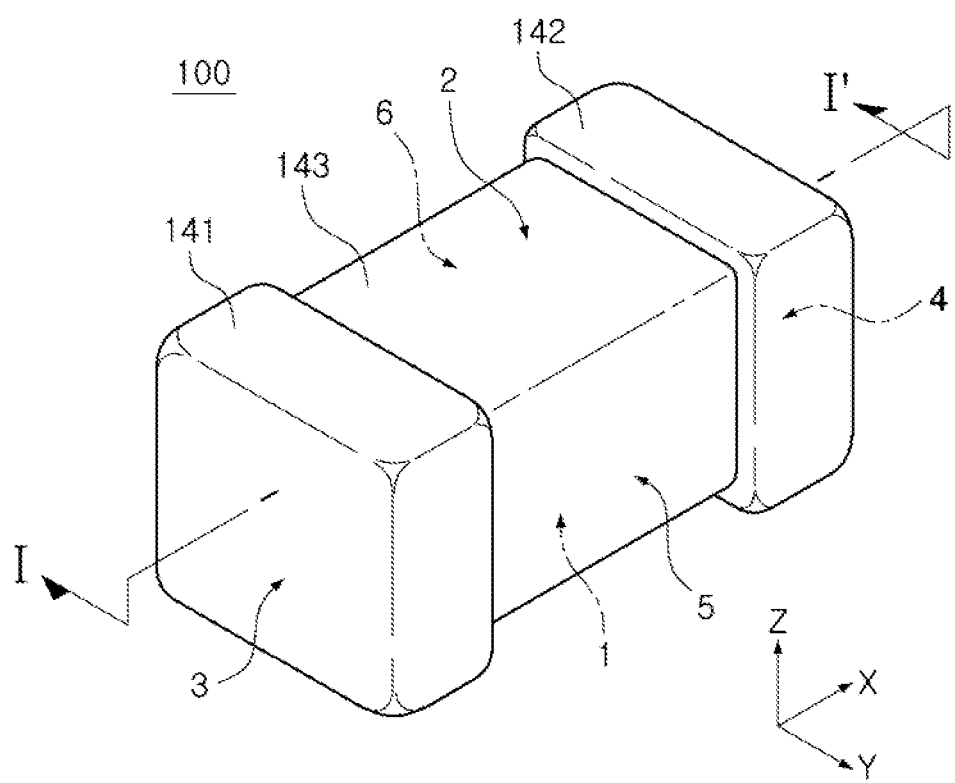
FIG. 1 is a schematic perspective view of a capacitor component according to an exemplary embodiment in the present disclosure.

Hereinafter, embodiments in the present disclosure will be described as follows with reference to the attached drawings. The present disclosure may, however, be embodied in many different forms and should not be construed as being limited to the embodiments set forth herein. Rather, these embodiments are provided so that this disclosure will be thorough and complete, and will fully convey the scope of the present disclosure to those skilled in the art. In the drawings, the shapes and dimensions of elements may be exaggerated for clarity, and the same reference numerals will be used throughout to designate the same or like components.

Also, elements having the same function within a scope of the same concept illustrated in drawings of respective embodiments will be described by using the same reference numerals. Terms used in the present specification are for explaining the embodiments rather than limiting the present invention. Unless explicitly described to the contrary, a singular form includes a plural form in the present specification. The words "comprise" and "include", and variations such as "comprises" or "comprising", and "includes" or "including", will be understood to imply the inclusion of stated constituents, steps, operations and/or elements but not the exclusion of any other constituents, steps, operations and/or elements.

In the drawings, without being limited thereto, an X direction may be defined as a first direction or a length direction, an Y direction as a second direction or a width direction, and a Z direction as a third direction, a thickness direction, or a lamination direction.

Capacitor Component

FIG. 1 is a schematic perspective view of a capacitor component according to an exemplary embodiment.

Figure 2:
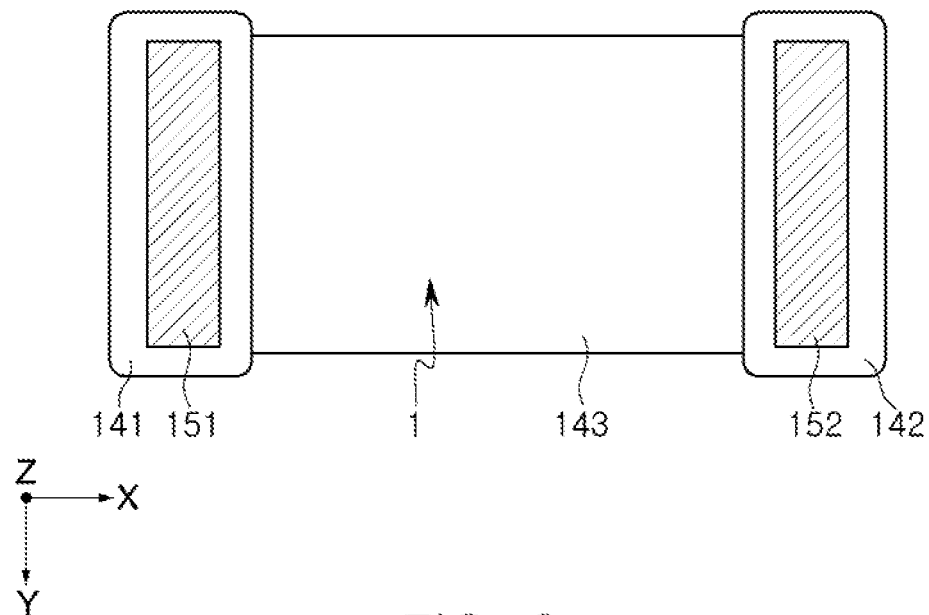
FIG. 2 is a plan view of a capacitor component shown in FIG. 1 when viewed on a first surface.

FIG. 2 is a plan view of a capacitor component shown in FIG. 1 when viewed on a first surface.

Figure 3:
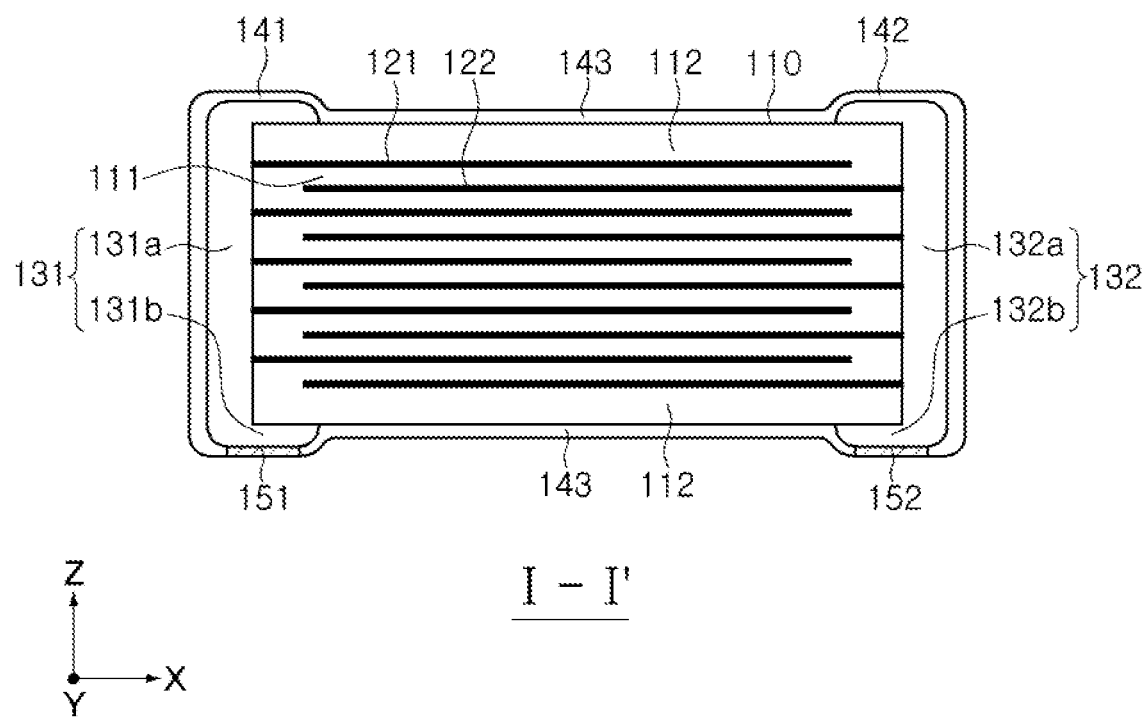
FIG. 3 is a schematic cross-sectional view taken along line I-I' shown in FIG. 1.

FIG. 3 is a schematic cross-sectional view taken along line I-I' shown in FIG. 1.

Figure 4A:
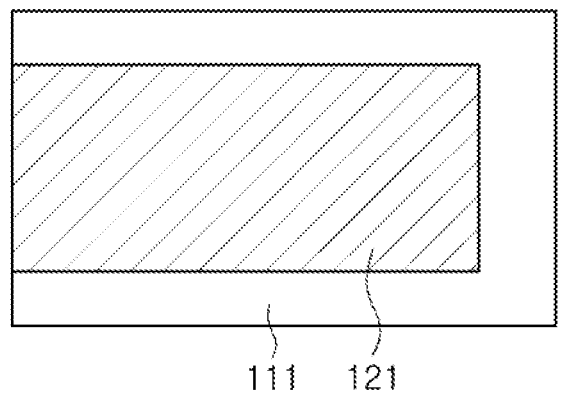
FIG. 4A and FIG. 4B illustrate a ceramic green sheet on which an internal electrode is printed for producing a body of a capacitor component according to an exemplary embodiment in the present disclosure.
Figure 4B:
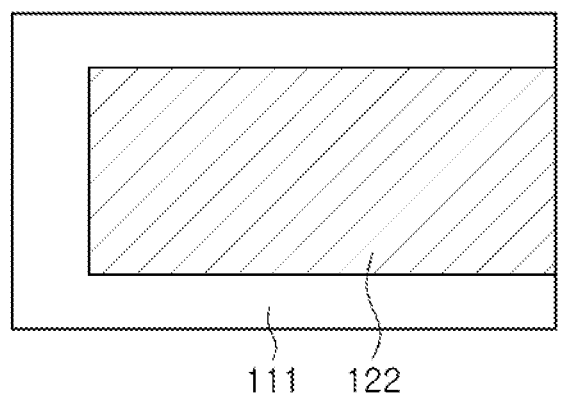

FIG. 4A and FIG. 4B illustrate a ceramic green sheet on which an internal electrode is printed for producing a body of a capacitor component according to the exemplary embodiment.

Hereinbelow, with reference to FIGS. 1 to 4, a capacitor component 100 according to an exemplary embodiment will be described in detail.

A capacitor component 100 according to the exemplary embodiment includes: a body 110 including a dielectric layer 111 and first and second internal electrodes 121 and 122 alternately disposed with the dielectric layer 111 interposed therebetween, and having first and second surfaces 1 and 2 opposing each other, third and fourth surfaces 3 and 4 connected to the first and second surfaces 1 and 2 and opposing each other, and fifth and sixth surfaces 5 and 6 connected to the first to fourth surfaces 1, 2, 3, and 4 and opposing each other; first and second external electrodes 131 and 132 including first and second connection portions 131a and 132a disposed on the third and fourth surfaces 3 and 4 of the body, respectively, and first and second band portions 131b and 132b extending onto portions of the first surface 1 from the first and second connection portions 131a and 132a, respectively; plating layers 151 and 152 disposed on the first and second band portions 131b and 132b, respectively; and humidity resistant layers 141, 142, and 143 disposed on portions of the first and second external electrodes in which the plating layers 151 and 152 are not disposed, and on portions of the body on which the first and second external electrodes 131 and 132 are not disposed.

The dielectric layer 111 and the internal electrodes 121 and 122 may be laminated alternately in the body 110.

The shape of the body 110 is not limited to any particular shape, and as illustrated, may have a hexahedron shape or a shape similar thereto. Due to shrinkage of a ceramic powder contained in the body 110 during a sintering process, the body 110 may not have a hexahedron shape having completely straight lines, but may have a substantially hexahedron shape.

The body 110 may have first and second surfaces 1 and 2 opposing each other in a thickness direction (a Z direction), third and fourth surfaces 3 and 4 connected to the first and second surfaces 1 and 2 and opposing each other in a width direction (a Y direction), and fifth and sixth surfaces 5 and 6 connected to the first and second surfaces 1 and 2, connected to the third and fourth surfaces 3 and 4, and opposing each other in a length direction (an X direction).

A plurality of dielectric layers 111 forming the body 110 may be in a sintered state, such that it may be difficult to identify boundaries between adjacent dielectric layers integrated with each other, without using a scanning electron microscope (SEM).

A material forming the dielectric layer 111 is not limited to any particular material as long as sufficient capacitance can be obtained therefrom. For example, the material may be barium titanate ($BaTiO_3$) powder particulates. As the material forming the dielectric layer 111, various ceramic additives, organic solvents, plasticizers, binders, dispersing agents, and the like, may be added to powder particulates, such as barium titanate ($BaTiO_3$) powder particulates, according to the purpose of the present disclosure.

Upper and lower portions of the body 110, both end portions of the body 110 in the thickness direction (the Z direction), may include cover layers 112 formed by laminating dielectric layers not including internal electrodes formed therein. The cover layers 112 may serve to maintain the reliability of a capacitor against external impacts.

Next, the internal electrodes 121 and 122 may be disposed alternately with the dielectric layer 111, and may include first and second internal electrodes 121 and 122. The first and second internal electrodes 121 and 122 may be alternately disposed, while opposing each other with the dielectric layers 111 forming the body 110 interposed therebetween, and may be exposed to the third and fourth surfaces 3 and 4 of the body 110, respectively.

The first and second internal electrodes 121 and 122 may be alternately exposed to the third surface 3 and the fourth surface 4, both end surfaces in a length direction of the body 110, to be connected to first and second external electrodes 131 and 132, respectively.

In detail, the first internal electrode 121 may be connected to the first external electrode 131 without being connected to the second external electrode 132, and the second internal electrode 122 may be connected to the second external electrode 132 without being connected to the first external electrode 131. Accordingly, the first internal electrode 121 may be spaced apart from the fourth surface 4 by a predetermined distance, and the second internal electrode 122 may be spaced apart from the third surface 3 by a predetermined distance.

In detail, the first and second internal electrodes 121 and 122 may be electrically insulated from each other by the dielectric layer 111 interposed therebetween.

A material forming the first and second internal electrodes 121 and 122 is not limited to any particular material. For example, the first and second internal electrodes 121 and 122 may be formed using a conductive paste formed of at least one material selected from nickel (Ni), copper (Cu), and precious metal materials, such as palladium (Pd), palladium-silver (Pd—Ag) alloys, and the like.

A method for printing the conductive paste may be a screen printing method, a gravure printing method, or the like, but the method is not limited thereto.

Referring to FIG. 4A and FIG. 4B, the body 110 may be formed by alternately laminating a ceramic green sheet on which the first internal electrode 121 is printed, and a ceramic green sheet on which the second internal electrode 122 is printed, and sintering the laminated ceramic green sheets.

The external electrodes 131 and 132 may be disposed on the body 110, and may be connected to the first and second internal electrodes 121 and 122. As illustrated in FIG. 3, the external electrodes 131 and 132 may include a first external electrode connected to the first internal electrode 121, and a second external electrode 132 connected to the second internal electrode 122. In the exemplary embodiment, the capacitor component 100 is described to have a structure with two external electrodes 131 and 132, however, the number, the shape, or the like, of the external electrodes 131 and 132 may change depending on the shape of the internal electrodes 121 and 122, or according to the intended purpose of the present disclosure.

The first and second external electrodes 131 and 132 may include first and second connection portions 131a and 132a, disposed on the first and fourth surfaces 3 and 4, respectively, and may include first and second band portions 131b and 132b extending onto portions of the first surface 1 from the first and second connection portions 131a and 132a, respectively.

The first and second connection portions 131a and 132a may be electrically connected to the first and second internal electrodes 121 and 122, respectively.

The first and second band portions 131b and 132b may be formed extending, not only onto portions of the first surface 1, but also onto portions of the second, fifth, and sixth surfaces 2, 5, and 6.

The external electrodes 131 and 132 may be formed by using any material having electrical conductivity, such as metal and the like. For example, the material may be selected on the basis of properties thereof, such as electrical properties, structural stability, and the like, and the external electrodes 131 and 132 may have a multilayer structure.

For example, the external electrodes 131 and 132 may be sintered electrodes containing a conductive metal and glass, or resin-based electrodes containing a base resin and a conductive metal.

In detail, the external electrode 131 and 132 may be formed by an atomic layer deposition (ALD) technique, a molecular layer deposition (MLD) technique, a chemical vapor deposition (CVD) technique, a sputtering technique, or the like.

When the external electrode 131 and 132 are sintered electrodes containing glass and a conductive material, corner portions in which the connection portions 131a and 132a meet the band portions 131b and 132b may be formed to have a small thickness, or end portions of the band portions 131b and 132b may be separated from the body 110, thus giving rise to humidity resistance reliability issues. Accordingly, when the external electrodes 131 and 132 contain glass and a conductive metal, the effects of improving humidity resistance reliability according to the present disclosure may be achieved more effectively.

The humidity resistant layers 141, 142, and 143 may include first and second humidity resistant layers 141 and 142 disposed on portions of the first and second external electrodes 131 and 132 on which plating layers 151 and 152 are not formed, and may include a third humidity resistant layer 143 disposed on portions of the body on which the first and second external electrodes 131 and 132 are not formed. In this case, external surfaces of a combined structure including the body 110 and the first and second external electrodes 131 and 132 may not be exposed externally and be covered by the humidity resistant layers 141, 142, and 143 and the plating layers 151 and 152.

The humidity resistant layers 141, 142, and 143 may serve to block humidity permeation paths, thus improving humidity resistance reliability.

The first and second humidity resistance layers 141 and 142 disposed on portions of the first and second external electrodes 131 and 132 on which the plating layers 151 and 152 are not formed, may serve to prevent humidity from permeating into the body through the external electrodes 131 and 132.

The third humidity resistant layer 143 may be disposed on portions of the body on which the first and second external electrodes 131 and 132 are not formed, and may serve to seal fine pores or cracks of the body 110 to prevent humidity from permeating into the body 110.

In addition, since the first and second humidity resistant layers 141 and 142, and the third humidity resistant layer 143 may be connected to each other to form a single humidity resistant layer 141, 142, and 143, so even the humidity permeation paths formed due to separation of the end portions of the band portions 131b and 132b from the body 110 may be blocked, thus further improving humidity resistance reliability.

As illustrated in FIG. 2, the first and second humidity resistant layers 141 and 142, disposed on portions of the first and second external electrodes on which the plating layers 151 and 152 are not disposed, may be disposed on edges of the band portions 131b and 132b, and the plating layers 151 and 152 may be disposed in center portions of the band portions 131b and 132b.

At the edges of the band portions 131b and 132b, corner portions in which the connection portions 131a and 132a meet the band portions 131b and 132b may be formed to be relatively thin, or separation of the end portions of the band portions 131b and 132b from the body 110 may occur, thus serving as main humidity permeation paths. Accordingly, by having the plating layers 151 and 152 disposed in center portions of the first and second band portions 131b and 132b, the humidity resistant layers may be disposed on the edges of the band portions 131b and 132b, thus further improving humidity resistance reliability.

The first to third humidity resistant layers 141, 142, and 143 may be formed by forming the external electrodes 131 and 132 on the body 110 including the dielectric layer and the internal electrodes, thereafter forming a humidity resistant layer of low humidity permeability on the entire external surface thereof, and then, removing therefrom portions on which the plating layers 151 and 152 will be later formed.

For example, the first to third humidity resistant layers 141, 142, and 143 may be formed by an atomic layer deposition (ALD) technique, a molecular layer deposition (MLD) technique, a chemical vapor deposition (CVD) technique, a sputtering technique, or the like.

In particular, when the humidity resistant layers 141, 142, and 143 are formed by an ALD technique, and include aluminum oxide ($Al_2O_3$), it may be possible to form the humidity resistant layers 141, 142, and 143 densely to secure excellent humidity resistance reliability, and to form the humidity resistant layers 141, 142, and 143 thinly to increase the effective volume ratio of a capacitor component.

The ALD technique may involve depositing a thin film or a protective film on the surface of a substrate during a semiconductor manufacturing process, and unlike the conventional deposition technique chemically coating a thin film, the ALD technique involves growing the thin film by laminating atomic layers one by one. The ALD technique has advantages in that it provides good step coverage, controls the thickness of a thin film conveniently, and forms a uniform thin film.

In addition, the humidity resistant layers 141, 142, and 143, when formed by the ALD technique using aluminum oxide ($Al_2O_3$), may be able to secure sufficient humidity resistance reliability even in a relatively small thickness of about 5 nm. Thus, thicknesses of the humidity resistant layers 141, 142, and 143 may be reduced, and accordingly, thus increasing the effective volume ratio of a capacitor component.

A hydrophobic layer, serving as a water repellent layer, may be further formed on the humidity resistant layers 141, 142, and 143. As the hydrophobic layer, which is an organic layer, is formed on the humidity resistant layers 141, 142, and 143, which are inorganic layers, humidity resistance reliability may be further improved.

Next, the plating layers 151 and 152 may be disposed on the first and second band portions 131b and 132b, and may include a first plating layer 151 and a second plating layer 152.

The first and second plating layers 151 and 152 may be a Ni-plating layer or a Sn-plating layer, and may be formed by laminating a Ni-plating layer and a Sn-plating layer sequentially on the first and second band portions 131b and 132b. Alternatively, the first and second plating layers 151 and 152 may include a plurality of Ni-plating layers and/or a plurality of Sn-plating layers.

According to the present disclosure, since the plating layers 151 and 152 are disposed on the first and second band portions 131b and 132b, it may be possible to minimize the plating layers 151 and 152, and thus to minimize the occurrence of defects caused by build-up of tin (Sn) or the like during the reflow process for bonding a capacitor component to a substrate, and further, it may be possible to minimize mounting area and to reduce acoustic noise.

The reflow process refers to a process of reliably bonding a multilayer ceramic capacitor to a substrate by melting solder cream through a heat treatment, to electrically connect the multilayer ceramic capacitor to the substrate.

The shape of the plating layers 151 and 152 are not limited to any particular shape. For example, when observed on the first surface 1, the plating layers 151 and 152 may have a rectangular or circular shape.

Meanwhile, the plating layers 151 and 152, when observed on the first surface 1, may be disposed in center portions of the first and second band portions 131b and 132b, respectively.

Since around edges of the band portions 131b and 132b, the corner portions in which the connection portions 131a and 132a are in contact with the band portions 131b and 132b may be formed to be relatively thin, or the ends of the band portions 131b and 132b may separate from the body 110, thus serving as main humidity permeation paths. Therefore, by having the plating layers 151 and 152 disposed in center portions of the first and second band portions 131b and 132b, respectively, and thereby having the humidity resistant layers 141 and 142 disposed on edges of the band portions 131b and 132b, humidity resistance reliability may be further improved.

Meanwhile, the plating layers 151 and 152 may be formed by forming the external electrodes 131 and 132 on the body 110 including the dielectric layer and the internal electrodes, forming a coating layer of low humidity permeability on the external surface thereof, thereafter removing therefrom portions on which the plating layers 151 and 152 will be later formed, and then plating the portions from which the coating layer has been removed.

A method for removing the portions on which the plating layers 151 and 152 will be later formed may be a laser machining process, a mechanical polishing process, a dry etching process, a wet etching process, a shadowing deposition process using a tape-protected layer, or the like.

Hereinbelow, a capacitor component 200 according to another exemplary embodiment will be described in greater detail.

Figure 5:
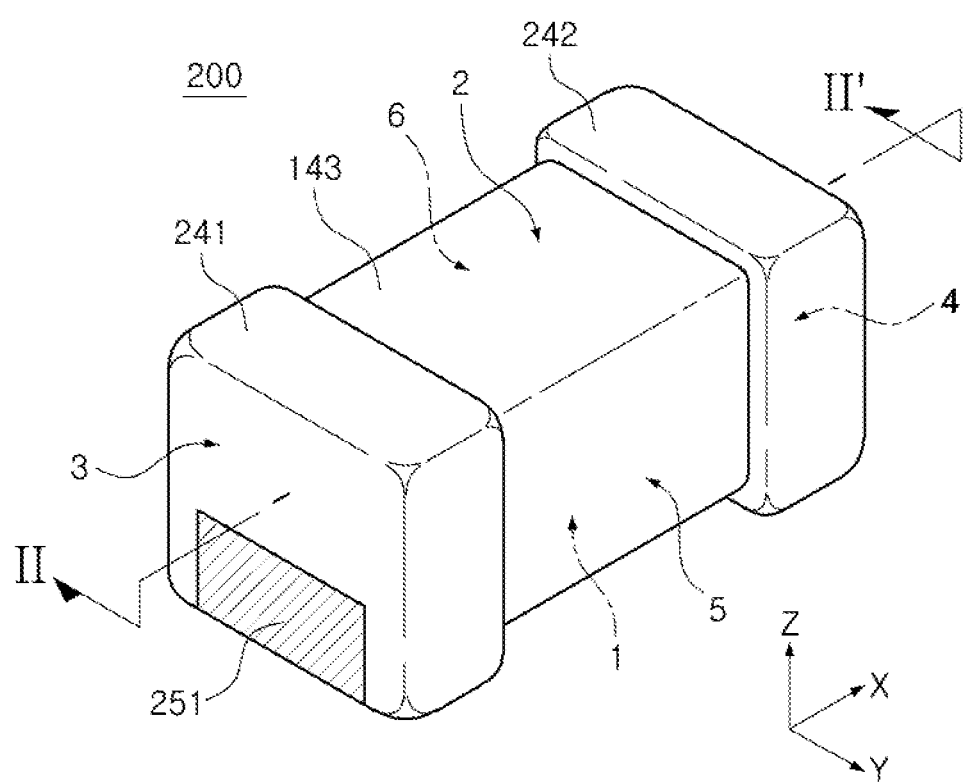
FIG. 5 is a schematic perspective view of a capacitor component according to another exemplary embodiment in the present disclosure.

FIG. 5 is a schematic perspective view of a capacitor component 200 according to the another exemplary embodiment.

Figure 6:
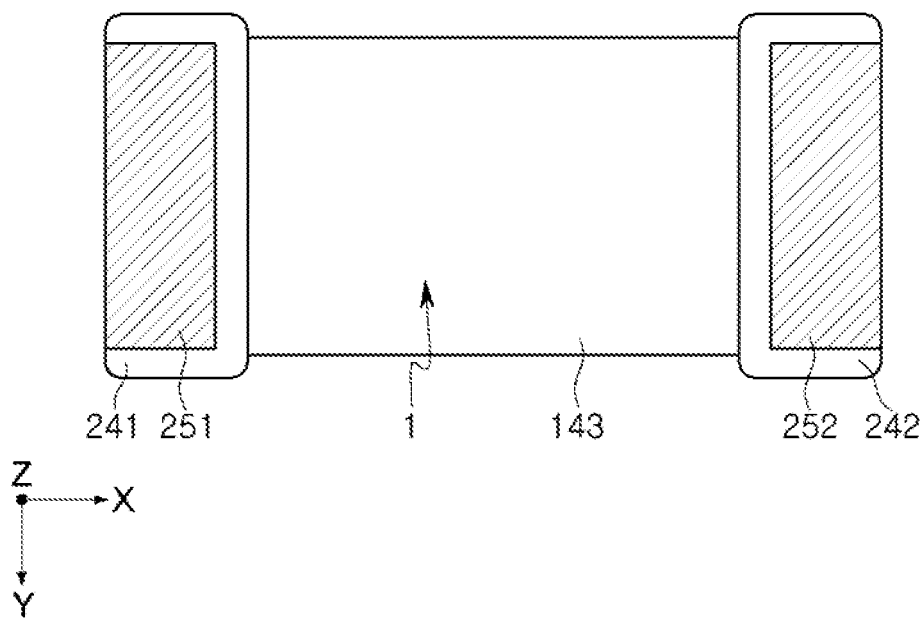
FIG. 6 is a plan view of a capacitor component shown in FIG. 5, viewed on a first surface.
Figure 7:
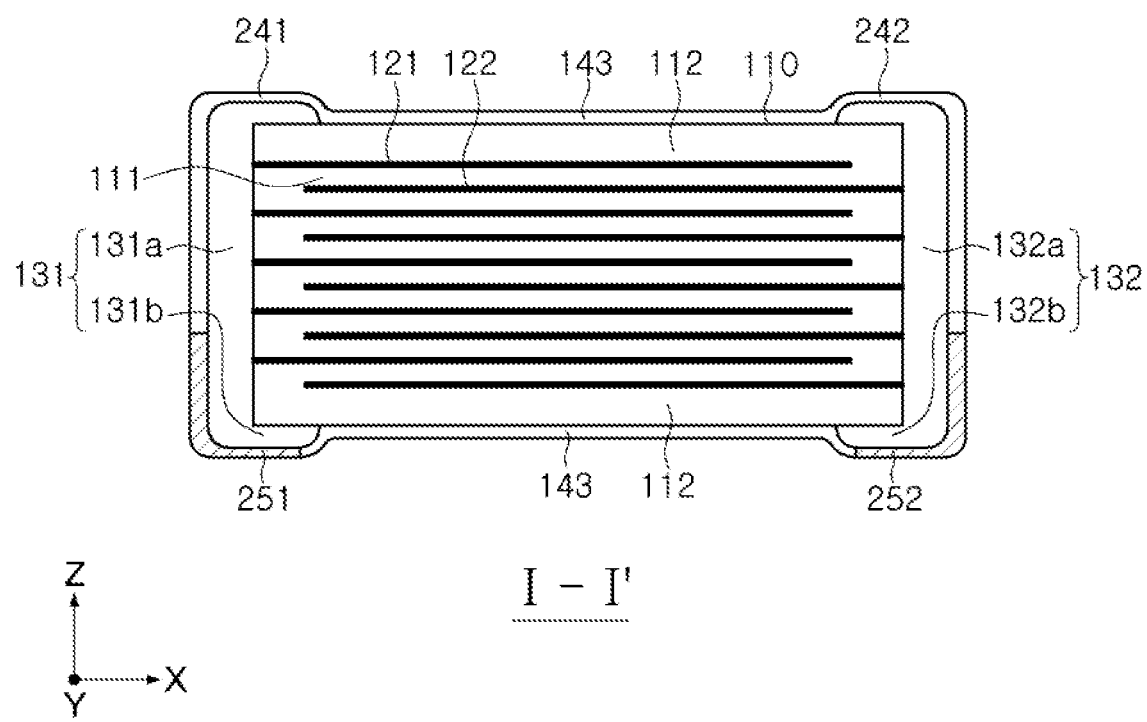
FIG. 7 is a schematic cross-sectional view taken along line II-II' shown in FIG. 5.

FIG. 6 is a plan view of a capacitor component shown in FIG. 5, viewed on the first surface; and FIG. 7 is a schematic cross-sectional view taken along line II-II' shown in FIG. 5.

Referring to FIGS. 5 to 7, the capacitor component 200 according to the another exemplary body includes: a body 110 including a dielectric layer 111 and first and second internal electrodes 121 and 122 alternately disposed with the dielectric layer 111 interposed therebetween, and having first and second surfaces 1 and 2 opposing each other, third and fourth surfaces 3 and 4 connected to the first and second surfaces 1 and 2 and opposing each other, and fifth and sixth surfaces 5 and 6 connected to the first to fourth surfaces 1, 2, 3, and 4, and opposing each other; first and second external electrodes 131 and 132 including first and second connection portions 131a and 132a disposed on the third and fourth surfaces 3 and 4 of the body 110, respectively, and first and second band portions 131b and 132b extending onto portions of the first surface 1 from the first and second connection portions 131a and 132a, respectively; first and second plating layers 251 and 252 disposed on the first and second band portions 131b and 132b, respectively, and extending onto portions of the first and second connection portions 131a and 132a, respectively; and humidity resistant layers 241, 242, ad 243 disposed on portions of the first and second external electrodes on which the plating layers are not disposed, and on portions of the body on which the first and second external electrodes are not disposed.

In the following, the description of the elements which are the same as the capacitor component 100 will be omitted to avoid redundancy.

In the capacitor component 200 according to another exemplary body in the present disclosure, the plating layers 251 and 252 may be disposed on the first and second band portions 131b and 132b, and may extend onto portions of the first and second connection portions 131a and 132a.

As the plating layers 251 and 252 are disposed extending onto portions of the first and second connection portions 131a and 132a, the first and second humidity resistant layers 241 and 242 disposed on portions of the first and second external electrodes 131 and 132 on which the plating layers 251 and 252 are not disposed, may have a shape different from the first and second humidity resistant layers 141 and 142 of the capacitor component 100 according to the one exemplary embodiment.

As the plating layers 251 and 252 may extend onto portions of the first and second connection portions 131a and 132a, when mounting on a substrate, bonding strength with the substrate may be further improved, thus enabling a more stable bonding with the substrate and improving mounting reliability.

In particular, the extended portions may occupy half or less of a distance between the first surface and the second surface in the connection portions 131a and 132a. For example, the extended portions may extend up to half of the thickness of the body 110.

When the plating layers 251 and 252 extend more than half of the thickness of the body 110, solder may be raised higher along the plating layers 251 and 252, thus causing undesirable acoustic noises.

According to the embodiments disclosed herein, a capacitor component may include plating layers disposed on band portions of external electrodes, and may include humidity resistant layers formed on other portions thereof, and thus may have improved humidity resistance reliability.

Hereinabove, the present disclosure has been described with reference to exemplary embodiments and the accompanying drawings. However, the present disclosure is not limited by the aforementioned exemplary embodiments and the accompanying drawings, but by the appended claims.

Accordingly, it should be understood that various modifications and alterations may be made by those skilled in the art to which the present disclosure pertains without departing from the scope of the present disclosure defined by the appended claims.

What is claimed is:

1. A capacitor component comprising:
a body including a dielectric layer and first and second internal electrodes alternately disposed with the dielectric layer interposed therebetween, and having first and second surfaces opposing each other in a thickness direction of the body, third and fourth surfaces connected to the first and second surfaces and opposing each other in a length direction of the body, and fifth and sixth surfaces connected to the first to fourth surfaces and opposing each other in a width direction of the body;
first and second external electrodes including first and second connection portions disposed on the third and fourth surfaces of the body, respectively, and first and second band portions extending onto portions of the first surface from the first and second connection portions, respectively;
first and second plating layers disposed on the first and second band portions, respectively; and
a humidity resistant layer, as an integral layer, disposed on the first and second external electrodes, and having first and second openings exposing portions of the first and second band portions disposed on the first surface, respectively,
wherein the first and second plating layers are disposed in the first and second openings of the humidity resistant layer, respectively, and are in contact with the first and second band portions, respectively,
the humidity resistant layer includes first portions opposing each other in the width direction and disposed on the first surface, the first portions of the humidity resistant layer provided as edges of the first opening which exposes the portion of the first band portion, and
the humidity resistant layer includes second portions opposing each other in the width direction and disposed on the first surface, the second portions of the humidity resistant layer provided as edges of the second opening which exposes the portion of the second band portion.

2. The capacitor component of claim 1, wherein the humidity resistant layer is disposed on portions of the first and second external electrodes on which the first and second plating layers are not disposed, and on portions of the body on which the first and second external electrodes are not disposed.

3. The capacitor component of claim 1, wherein the humidity resistant layer is a single integral layer covering the entirety of portions of the first, second, fifth, and sixth surfaces of the body between the first and second external electrodes, and covering the entirety of the first and second external electrodes including the first and second connection portions except the portions exposed by the openings.

4. The capacitor component of claim 1, wherein the first and second plating layers are disposed on the first and second band portions on only the first surface among the first to sixth surfaces.

5. The capacitor component of claim 1, wherein each of the first and second plating layers includes a Ni-plating layer and a Sn-plating layer disposed on the Ni-plating layer.

6. The capacitor component of claim 1, wherein the humidity resistant layer is formed by atomic layer deposition (ALD), molecular layer deposition (MLD), or chemical vapor deposition (CVD).

7. The capacitor component of claim 1, wherein the humidity resistant layer contains aluminum oxide ($Al_2O_3$).

8. The capacitor component of claim 1, wherein the humidity resistant layer is formed by ALD, and contains aluminum oxide ($Al_2O_3$).

9. The capacitor component of claim 1, wherein the first and second external electrodes contain a conductive metal and glass.

10. The capacitor component of claim 1, wherein each of the plating layers has a rectangular or circular shape, when viewed on the first surface.

11. The capacitor component of claim 1, wherein each of the plating layers is disposed in a center portion of each of the band portions, when viewed on the first surface.

12. The capacitor component of claim 1, further comprising a hydrophobic layer disposed on the humidity resistant layer.

13. A capacitor component comprising:
a body including a dielectric layer and first and second internal electrodes alternately disposed with the dielectric layer interposed therebetween, and having first and second surfaces opposing each other in a thickness direction of the body, third and fourth surfaces connected to the first and second surfaces and opposing each other in a length direction of the body, and fifth and sixth surfaces connected to the first to fourth surfaces and opposing each other in a width direction of the body;
first and second external electrodes, each including first and second connection portions disposed on the third and fourth surfaces of the body, respectively, and first and second band portions extended to a portion of the first surface from the first and second connection portions, respectively;
first and second plating layers disposed on the first and second band portions, respectively, and extending onto portions of the first and second connection portions, respectively; and
a humidity resistant layer, as an integral layer, disposed on the first and second external electrodes, and having a first opening respectively exposing a portion of the first band portion on the first surface and a portion of the first connection portion, and a second opening exposing a portion of the second band portion on the first surface and a portion of the second connection portion,
wherein the first plating layer is disposed in the first opening of the humidity resistant layer, and is in contact with the first band portion and the first connection portion, the second plating layer is disposed in the second opening of the humidity resistant layer, and is in contact with the second band portion and the second connection portion, the humidity resistant layer includes first portions opposing each other in the width direction and disposed on the first surface, the first portions of the humidity resistant layer provided as edges of the first opening which exposes the portion of the first band portion, and the humidity resistant layer includes second portions opposing each other in the width direction and disposed on the first surface, the second portions of the humidity resistant layer provided as edges of the second opening which exposes the portion of the second band portion.

14. The capacitor component of claim 13, wherein the humidity resistant layer is disposed on portions of the first and second external electrodes on which the first and second plating layers are not disposed, and on portions of the body on which the first and second external electrodes are not disposed.

15. The capacitor component of claim 13, wherein the first and second plating layers include a Ni-plating layer and a Sn-plating layer disposed on the Ni-plating layer.

16. The capacitor component of claim 13, wherein a portion of each of the first and second connection portions occupies half or less of a distance from the first surface to the second surface.

17. The capacitor component of claim 13, wherein the humidity resistant layer is formed by ALD, and contains aluminum oxide ($Al_2O_3$).

18. The capacitor component of claim 13, wherein each of the first and second external electrodes contains a conductive metal and glass.

19. The capacitor component of claim 13, further comprising a hydrophobic layer disposed on the one integral layer.

20. A capacitor component comprising: a body including a dielectric layer and first and second internal electrodes alternately disposed with the dielectric layer interposed therebetween, and having first and second surfaces opposing each other, third and fourth surfaces connected to the first and second surfaces and opposing each other, and fifth and sixth surfaces connected to the first to fourth surfaces and opposing each other;

first and second external electrodes, each including first and second connection portions disposed on the third and fourth surfaces of the body, respectively, and first and second band portions extended to a portion of the first surface from the first and second connection portions, respectively;

first and second plating layers disposed on the first and second band portions, respectively, and extending onto portions of the first and second connection portions, respectively; and a humidity resistant layer, as an integral layer, covering the entire second surface, disposed on the first and second external electrodes, and having openings respectively exposing portions of the first and second band portions on the first surface and portions of the first and second connection portions, wherein the first plating layer is disposed in the openings of the humidity resistant layers exposing the first band portion and the portion of the first connection portion, and is in contact with the first band portion and the first connection portion, the second plating layer is disposed in the openings of the humidity resistant layers exposing the second band portion and the portion of the second connection portion, and is in contact with the second band portion and the second connection portion, the humidity resistant layer, as an integral layer, covering the entirety of portions of the first, second, fifth, and sixth surfaces of the body between the first and second external electrodes, and covering the entirety of the first and second external electrodes except the portions exposed by the openings, the first plating layer is disposed on only the first band portion on the first surface and the first connection portion on the third surface, and the second plating layer is disposed on only the second band portion on the first surface and the second connection portion on the fourth surface.

* * * * *